US009664861B2

(12) United States Patent
Waldron et al.

(10) Patent No.: US 9,664,861 B2
(45) Date of Patent: May 30, 2017

(54) OPTICAL FIBER INTERCONNECT ASSEMBLY

(71) Applicants: Mark Randall Waldron, Poplar Grove, IL (US); Thomas D. Schiltz, Naperville, IL (US); MOLEX INCORPORATED, Lisle, IL (US)

(72) Inventors: Mark Randall Waldron, Poplar Grove, IL (US); Thomas D. Schiltz, Naperville, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/761,441

(22) PCT Filed: Jan. 20, 2014

(86) PCT No.: PCT/US2014/012196
§ 371 (c)(1),
(2) Date: Jul. 16, 2015

(87) PCT Pub. No.: WO2014/113753
PCT Pub. Date: Jul. 24, 2014

(65) Prior Publication Data
US 2015/0362682 A1 Dec. 17, 2015

Related U.S. Application Data

(60) Provisional application No. 61/754,243, filed on Jan. 18, 2013.

(51) Int. Cl.
*G02B 6/38* (2006.01)
*G02B 6/42* (2006.01)

(52) U.S. Cl.
CPC ......... *G02B 6/3821* (2013.01); *G02B 6/3825* (2013.01); *G02B 6/3893* (2013.01);
(Continued)

(58) Field of Classification Search
CPC ........................... G02B 6/3821; G02B 6/3825
See application file for complete search history.

(56) References Cited

U.S. PATENT DOCUMENTS

| 5,775,931 A | 7/1998 | Jones |
| 6,135,644 A | 10/2000 | Hakogi et al. |

(Continued)

FOREIGN PATENT DOCUMENTS

| JP | 2008-191187 A | 8/2008 |
| JP | 2012-032656 A | 2/2012 |

(Continued)

*Primary Examiner* — Jerry Rahll
(74) *Attorney, Agent, or Firm* — Jeffrey K. Jacobs

(57) ABSTRACT

An optical fiber interconnect assembly includes a first housing component with deflectable locking arms having a locking section and an engagement section. The locking arms are movable between a first locked position and a second unlocked position. A second housing component is operatively slidable relative to the first housing component between a locking position and an unlocking position. An engagement section moves the locking arm to its second unlocked position upon movement of the second housing component to its second unlocking position. A ferrule is movably mounted between the first housing component and the second housing component. At least one biasing member biases the ferrule for movement.

20 Claims, 16 Drawing Sheets

(52) U.S. Cl.
CPC ......... *G02B 6/3897* (2013.01); *G02B 6/4249* (2013.01); *G02B 6/4269* (2013.01); *G02B 6/4292* (2013.01); *G02B 6/3881* (2013.01); *G02B 6/3885* (2013.01)

(56) References Cited

U.S. PATENT DOCUMENTS

| | | |
|---|---|---|
| 6,290,527 B1 | 9/2001 | Takaya et al. |
| 6,409,393 B1 | 6/2002 | Grois et al. |
| 2012/0027359 A1 | 2/2012 | Katoh |
| 2014/0193120 A1 | 7/2014 | Hodge et al. |

FOREIGN PATENT DOCUMENTS

| | | |
|---|---|---|
| JP | 2012-173490 A | 9/2012 |
| JP | 2012-177780 A | 9/2012 |

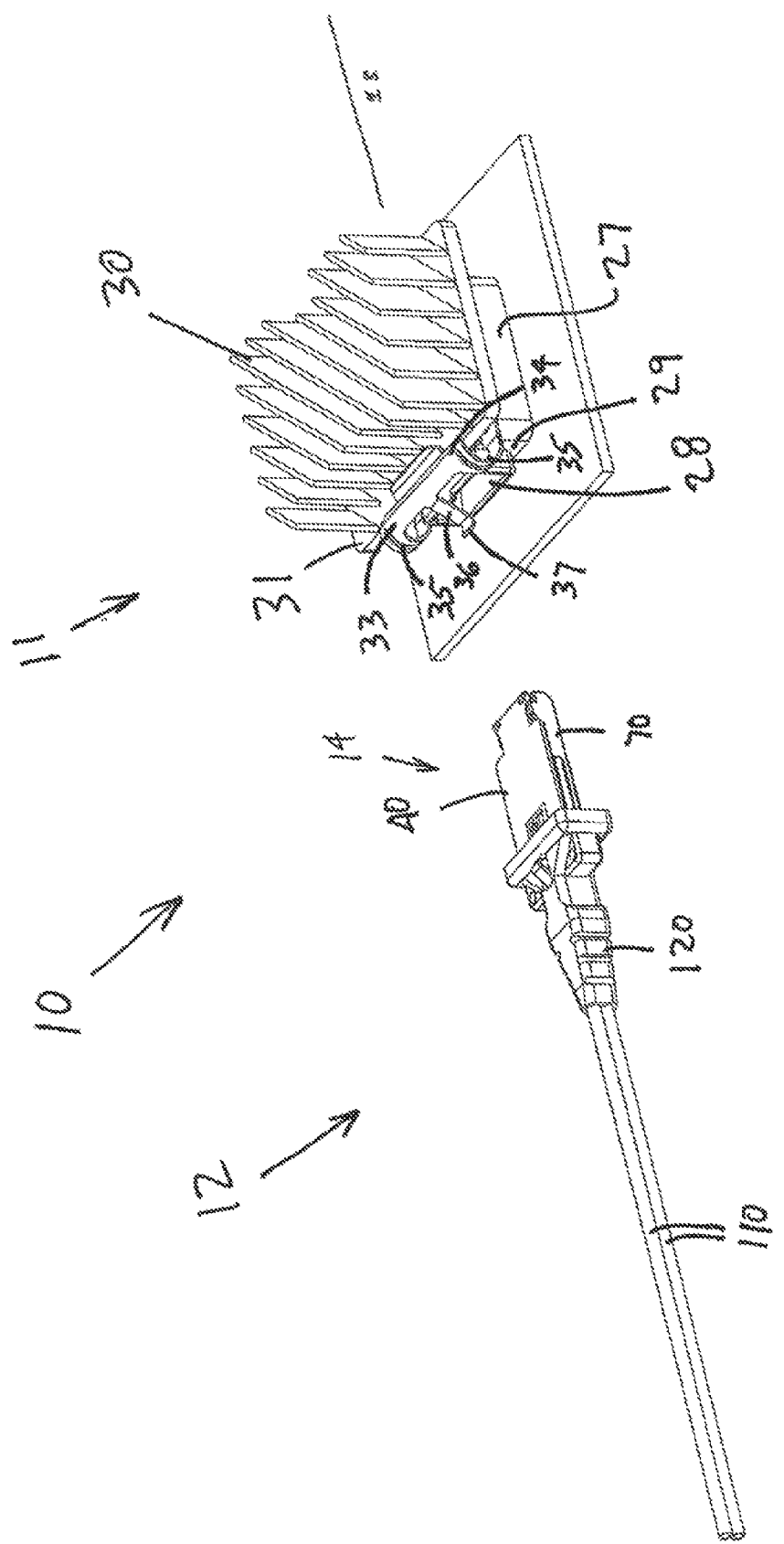

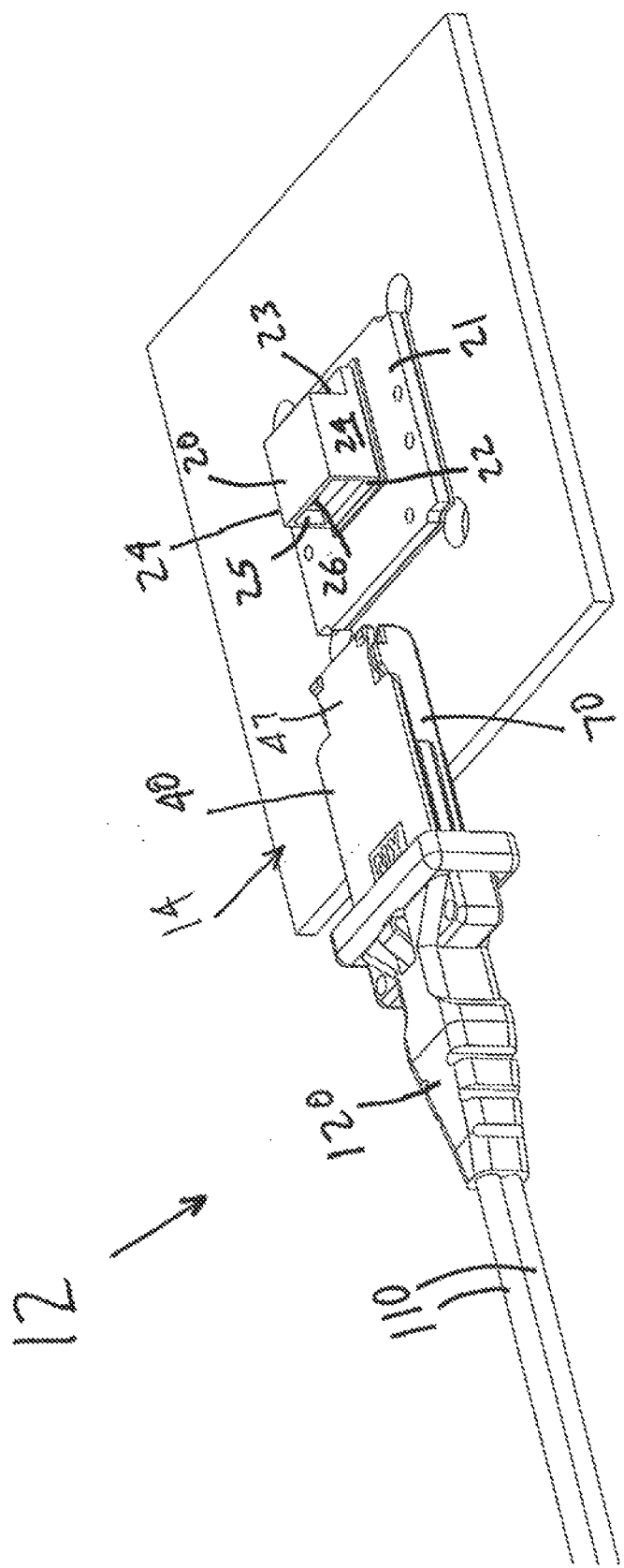

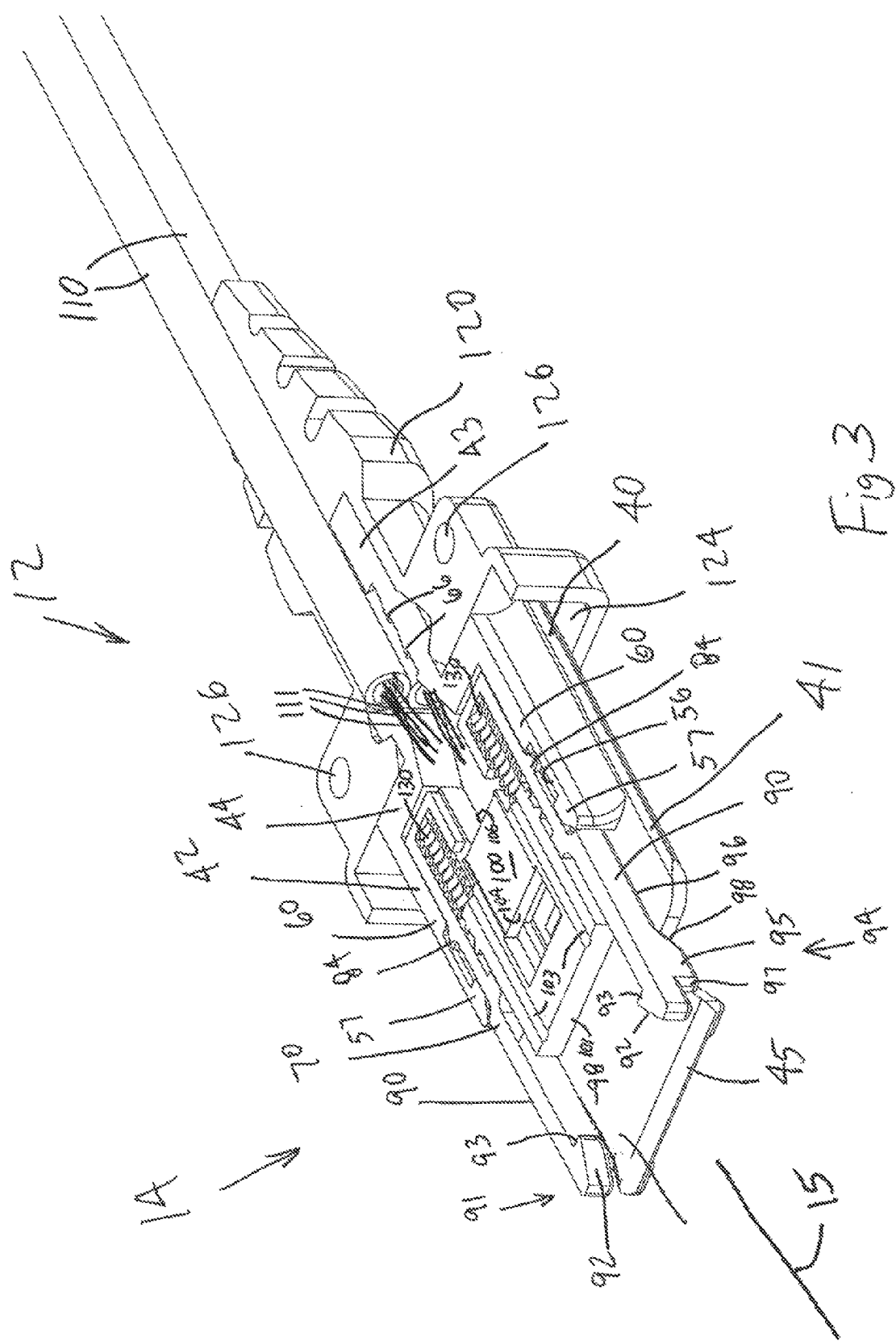

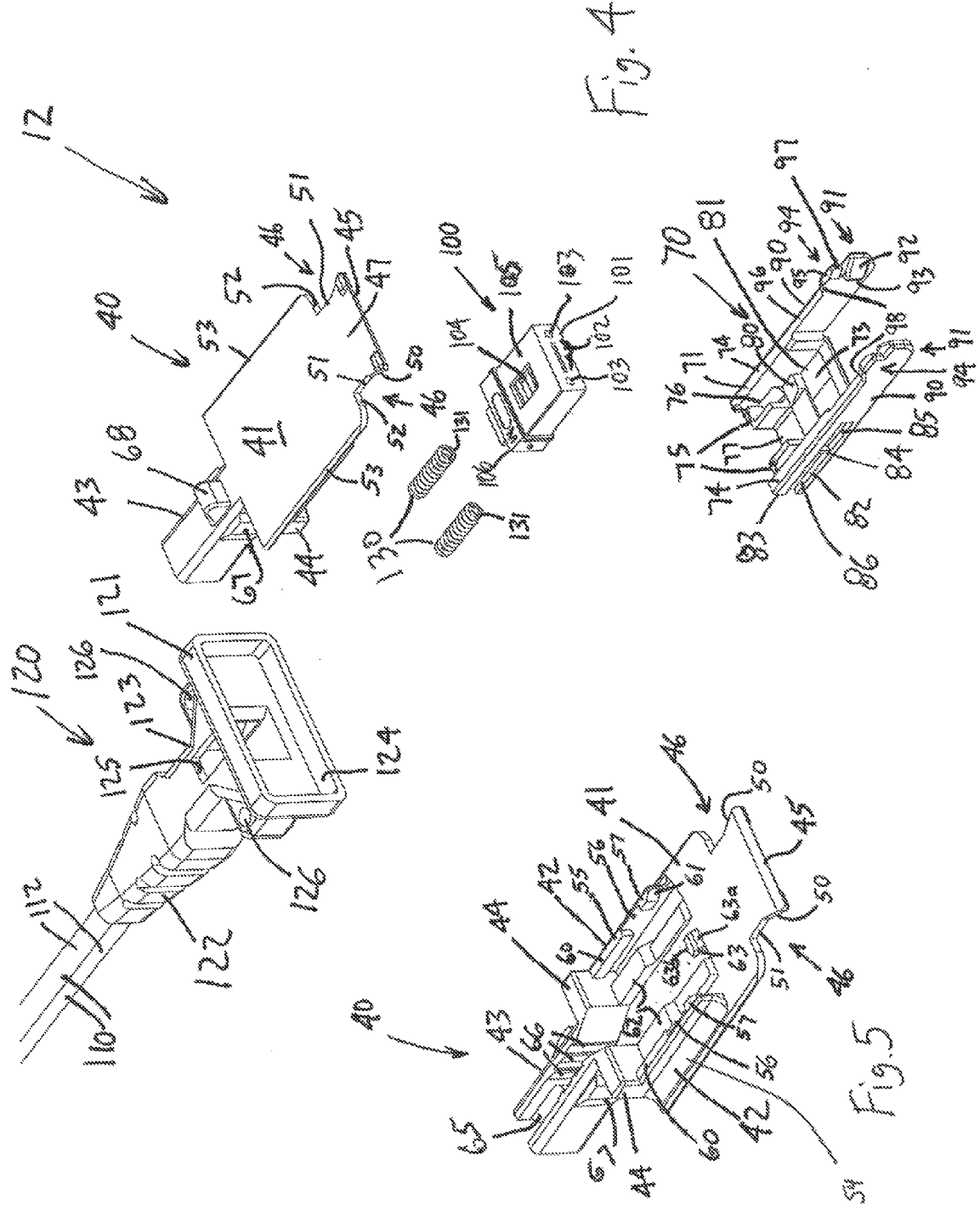

OPTICAL FIBER INTERCONNECT ASSEMBLY

REFERENCE TO RELATED APPLICATIONS

The Present Disclosure claims priority to prior-filed U.S. Provisional Patent Application No. 61/754,243, entitled "Optical Engine (POD) MT-Based Fiber Optic Connector," filed on 18 Jan. 2013 with the United States Patent And Trademark Office. The content of the aforementioned Patent Application is incorporated in its entirety herein.

BACKGROUND OF THE PRESENT DISCLOSURE

The Present Disclosure relates, generally, to optical fiber assemblies, and, more particularly, to a low profile optical fiber interconnect assembly having a latching mechanism.

Systems for interconnecting optical fibers or optical waveguides typically utilize a mating optical fiber interconnect assembly to facilitate the handling and accurate positioning of optical fibers. Individual optical fibers may be secured within a ferrule of the interconnect assembly and the ferrule aligned with a mating component to align the axis of each mating pair of waveguides.

Mating and unmating of optical fiber interconnect assemblies and sub-assemblies may be somewhat difficult in systems that have a high density of components. In addition, it is typically desirable to minimize the size of the interconnect assemblies. This creates the challenges of reducing size while maintaining or improving the functionality of the interconnect assemblies.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended Claims.

SUMMARY OF THE PRESENT DISCLOSURE

In one aspect, an optical fiber interconnect assembly includes a first housing component having a pair of spaced apart deflectable locking arms. Each locking arm has a locking section and an engagement section, with the locking section being configured to engage a mating optical component. The locking arms are movable between a first operative position, at which each locking section engages the mating optical component to lock the optical fiber interconnect assembly to the mating optical component, and a second operative position, at which the locking arms are deflected and each locking section is spaced from the mating optical component. A second housing component is operatively slidable relative to the first housing component between a locking position and an unlocking position. The second housing component has an engagement section configured to engage the engagement section of each locking arm to move the locking arm to its second operative position upon movement of the second housing component to its second unlocking position. A ferrule receiving opening is between the first housing component and the second housing component. A multi-fiber ferrule is movably mounted within the ferrule receiving opening. The ferrule has a plurality of bores with each bore being configured to receive an optical fiber therein. At least one biasing member biases the ferrule for movement within the ferrule receiving opening in a direction of mating the optical fiber interconnect assembly.

In another aspect, an optical fiber plug interconnect assembly includes a first housing component having a pair of spaced apart deflectable locking arms and each locking arm has a locking section and an engagement section. The locking section is configured to engage a mating optical component. The locking arms are movable between a first operative position, at which each locking section engages the mating optical component to lock the optical fiber interconnect assembly to the mating optical component, and a second operative position, at which the locking arms are deflected and each locking section is spaced from the mating optical component. A second housing component is operatively slidable relative to the first housing component between a locking position and an unlocking position. The second housing component has a generally planar web with side edges configured to engage the engagement section of each locking arm to move the locking arm from the first operative position to the second operative position upon movement of the second housing component to its second unlocking position. An optical fiber ferrule is movably mounted within a ferrule receiving opening and the ferrule has a waveguide therein. At least one spring member biases the ferrule for movement within the ferrule receiving opening.

In still another aspect, an optical fiber interconnect assembly includes a plug interconnect assembly and a receptacle interconnect assembly. The plug interconnect assembly includes a first housing component having a pair of spaced apart deflectable locking arms and each locking arm has a locking section and an engagement section. The locking section is configured to engage a mating optical component. The locking arms are movable between a first operative position, at which each locking section engages the mating optical component to lock the optical fiber interconnect assembly to the mating optical component, and a second operative position, at which the locking arms are deflected and each locking section is spaced from the mating optical component. A second housing component is operatively slidable relative to the first housing component between a locking position and an unlocking position. The second housing component has an engagement section configured to engage the engagement section of each locking arm to move the locking arm to its second operative position upon movement of the second housing component to its second unlocking position. A ferrule is movably mounted within a ferrule receiving opening and has a plurality of waveguides therein. At least one spring member is provided to bias the ferrule for movement within the ferrule receiving opening. The receptacle interconnect assembly includes a housing member having at least one receptacle with a plug receiving section in communication with an optical interconnect mounting section. The plug receiving section being configured to receive the plug interconnect assembly therein and the optical interconnect mounting section being configured to receive an optical interconnect therein. The optical interconnect mounting section has a support member for securing the optical interconnect within the optical interconnect mounting section and a side opening on each side of the optical interconnect and a top opening adjacent a top surface of the optical interconnect. Each side opening is configured to receive one of the locking arms therein and the top opening is configured to receive a leading edge of the second housing component of the plug interconnect assembly therein. An optical interconnect has a plurality of waveguides therein with the optical interconnect being mounted in the optical interconnect mounting section.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which:

FIG. 1 is a perspective view of a mating optical fiber interconnect system;

FIG. 2 is a perspective view of the mating optical fiber interconnect system of FIG. 1, but with the optical device housing and heat sink removed for clarity;

FIG. 3 is a section of the plug interconnect assembly taken generally along Line 3-3 in FIG. 1;

FIG. 4 is an exploded perspective view of the plug interconnect assembly of FIG. 1;

FIG. 5 is a perspective view of the cover from the plug interconnect assembly of FIG. 4 but with the cover rotated 180°;

DESCRIPTION OF THE PREFERRED EMBODIMENTS

Figure 6:
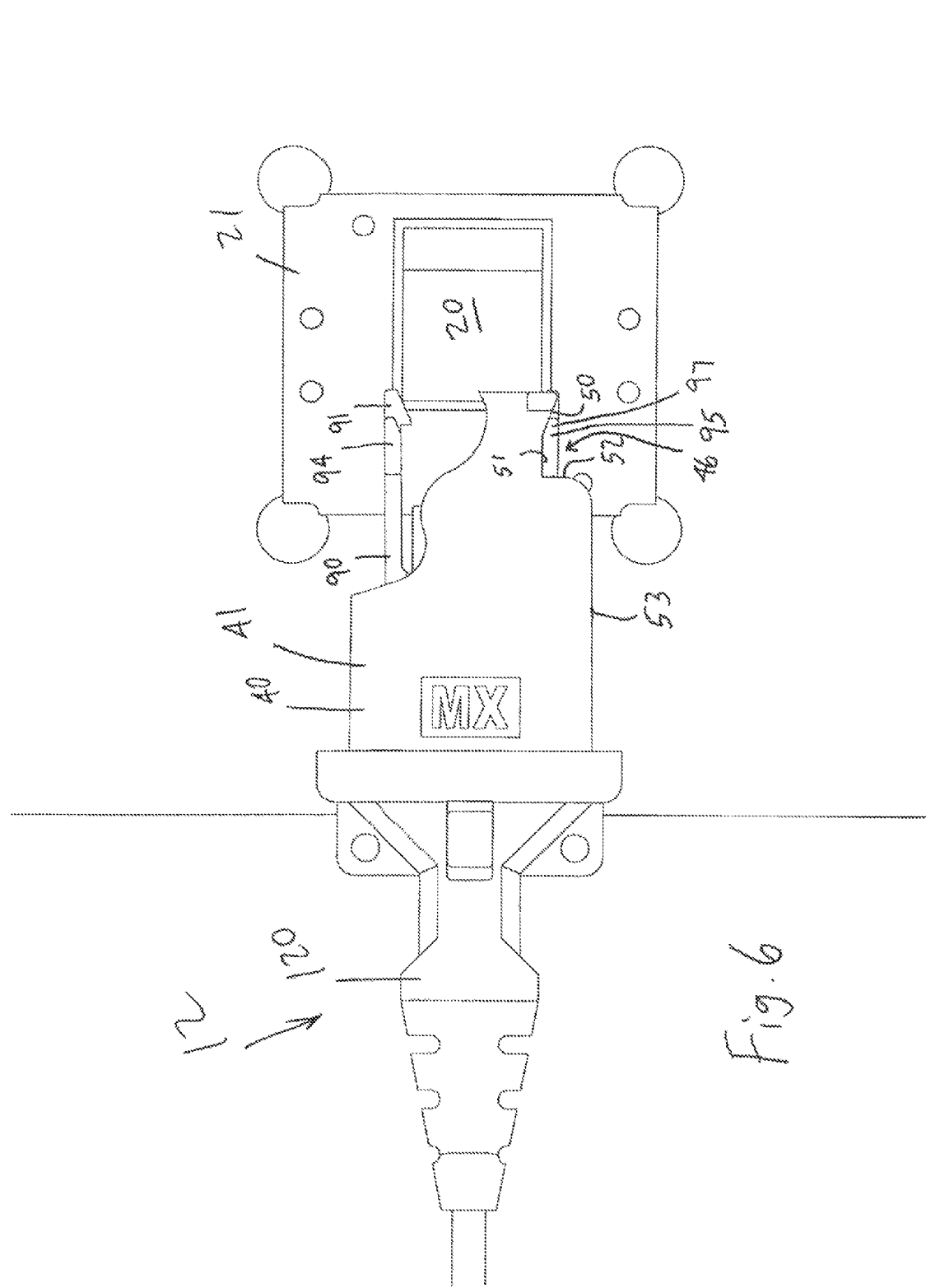
FIG. 6 is a top plan view of the mating optical fiber interconnect system of FIG. 2 immediately prior to mating of the interconnect system, with a portion of the cover of the plug interconnect assembly removed for clarity.

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

FIGS. 1-2 depict a mating optical fiber interconnect system 10. More specifically, the interconnect system 10 includes a first optical fiber assembly configured as a board mounted receptacle interconnect assembly 11, and a second optical fiber assembly configured as a plug interconnect assembly 12 that mates with the receptacle interconnect assembly along mating axis 13. However, the principles and concepts disclosed herein are equally applicable to a wide variety of interconnect systems and assemblies regardless of configuration.

Referring to FIG. 2, board mounted receptacle interconnect assembly 11 includes an optical component or interconnect 20 mounted on an optical device substrate 21. As depicted, the optical interconnect 20 is an optical prism with a plurality of optical waveguides (not shown) but the optical interconnect may have any of a plurality of different applications and configurations. Optical interconnect 20 is generally rectangular and has a front wall 22, a generally planar rear wall 23, and oppositely facing planar sidewalls 24 that extend between and connect the front wall and the rear wall.

A generally rectangular opening or receptacle 25 extends through the front wall 22 rearwardly towards rear wall 23. The receptacle 25 has an interior mating face (not shown) and the waveguides direct optical signals from the substrate 21 to the interior mating face. The receptacle 25 is dimensioned to receive ferrule 100 of plug interconnect assembly 12 as described in more detail below. Receptacle 25 may further include a pair of guide posts 26 (only one of which is visible) that extend from the interior mating face towards the front wall 22 to align the waveguides of the optical interconnect 20 with the optical fibers 111 within ferrule 100 of mating plug interconnect assembly 12. The optical device substrate 21 may include any of a plurality of active or passive optical components (not shown) mounted thereon.

Referring back to FIG. 1, receptacle interconnect assembly 11 may include an optical device housing 27 surrounding the optical interconnect 20 and the optical device substrate 21. Optical device housing 27 includes a housing receptacle 28 along a mating side 29 thereof with the housing receptacle axially aligned with the receptacle 25 of optical interconnect 20. The housing receptacle 28 is dimensioned to permit the mating end portion 14 of plug interconnect assembly 12 to be inserted therein as described in more detail below. If desired, optical device housing 27 may be formed of a heat-conductive material such as metal and a heat sink 30 may be removably mounted on the housing.

Optical device housing 27 may further include a resilient clip 33 adjacent the mating side 29 of the housing and aligned with the housing receptacle 28. As depicted, the resilient clip 33 has an engagement member 34 interconnected by a pair of generally C-shaped resilient arms 35. The engagement member 34 is configured to engage an upwardly facing surface 31 of the heat sink 30 to assist in removably securing the heat sink to the optical device housing 27. Resilient clip 33 may further include a resilient locking arm 36 extending in a direction generally opposite the C-shaped resilient arms 35. Resilient locking arm 36 is generally aligned along housing receptacle 28 of optical device housing 27 and includes an arcuate end portion 37. Resilient locking arm 36 and arcuate end portion 37 are configured to engage a locking projection 68 of plug interconnect assembly 12 to assist in securing the plug interconnect assembly to the receptacle interconnect assembly 11 as described in more detail below.

Referring to FIGS. 1-5, plug interconnect assembly 12 includes a first housing component or cover 40 and a second housing component or base 70 between which is positioned ferrule 100. A pair of optical fiber cables 110 are terminated to the ferrule 100 and a boot 120 is positioned over a portion of the cover 40 and the base 70.

As best seen in FIG. 5, cover 40 includes a generally planar web 41, a pair of spaced apart sidewalls 42 generally perpendicular to the plane of web 41, and a cable engaging rear section 43 extending rearwardly from back wall 44. More specifically, web 41 is generally rectangular and extends from back wall 44 forward to a mating or leading edge 45. A pair of cutouts or recesses 46 result in a forward portion 47 of web 41 having a reduced width. Each recess 46 is defined by a tapered edge 50 extending from the leading edge 45 rearwardly to a linear reduced width edge 51 that extends generally parallel to the central axis 15 (FIG. 3) of plug interconnect assembly 12. Transition edge 52 extends from reduced width edge 51 to the side edge 53 of web 41. Web 41 may be relatively thin to reduce the profile or vertical height of plug interconnect assembly 12. In addition, the relatively thin configuration of web 41 also permits the forward portion 47 of the web to be relatively flexible to assist assembly of the plug interconnect assembly 12.

Sidewalk 42 extend forward from back wall 44 and are generally parallel to side edges 53 of web 41. If desired, the sidewalk 42 may have generally tapered or sloped outer surfaces 54. Each sidewall 42 has a projection or rail 55 along its upper edge extending from the sidewall or inwards towards the opposite sidewall. Each rail 55 has a recess 56 to define a forward section 57 of the rail and a rearward section 60 of the rail. If desired, forward section 57 may include a tapered leading edge 61 to assist in assembly of the plug interconnect assembly 12. The rail 55 has rectangular cross section, hut may have other cross-sections as desired.

A pair of spaced apart spring engaging projections 62 may extend away from the plane of web 41 between sidewalk 42. The projections 62 are aligned with springs 130 and assist in supporting the springs as described in more detail below. A ferrule engaging projection 63 may also extend away from the plane of web 41 and is centered between sidewalk 42. The ferrule engaging projection 63 is positioned to limit motion of ferrule 100 as described in more detail below. Ferrule engaging projection 63 may include a tapered leading edge 63a to assist in assembly and a rearward engagement edge 63b.

A cable receiving slot 65 extends through rear section 43 and back wall 44 and may have a plurality of cable engaging projections 66. The cable receiving slot 65 and cable engaging projections 66 are dimensioned to snugly receive a portion of cable 110 therein. Rear section 43 may further include boot engaging projections 67 extending from an outer surface thereof in addition, rear section 43 may have a locking projection 68 extending from a surface of the cover 40 opposite the sidewalls 42.

Base 70 includes a generally U-shaped body 71 with a resilient latching or locking arm 90 extending from opposite sides of the body. Body 71 has a floor 73 with a pair of spaced apart sidewalls 74 extending from opposite edges of the base. A pair of L-shaped walls 75 extend upward from floor 73 with each interconnecting to one of the sidewalk 74. Each sidewall 74 and L-shaped wall 75 define a spring-receiving recess 76 into which a portion of one of the springs 130 is inserted. An opening 77 between the L-shaped walls 75 defines a space through which a portion of cable 110 extends. A pair of spaced apart projections 80 extend from floor 73 and define a rearward limit to which the ferrule 100 may move relative to the base 70. Floor 73 and sidewalls 74 define a ferrule receiving cavity or recess 81 forward of the projections 80.

The lateral outer surface of each sidewall 74 includes a channel 82 that extends forward from rear edge 83 of the base 70 approximately the entire length of the sidewalls. A vertical bar or projection 84 extends across and divides the channel 82 to define a forward section 85 of the channel and a rearward section 86 of the channel. Each channel 82 has a generally rectangular cross-section and is dimensioned to slidingly receive thereon one of the rails 55 of cover 40. Rails 55 and channels 82 may have complimentary interengaging cross-sections of other configurations as desired.

Each locking arm 90 extends in a cantilevered manner generally parallel to or extends from one of the sidewalls 74. Each locking arm 90 has a locking section 91 and an engagement section 94. The locking section 91 is located at the end of the locking arm and has a tapered inner surface 92 and a locking edge 93 rearward from the tip. The tapered inner surface 92 is configured to engage one of the sidewalls 24 of optical interconnect 21 to cause the locking arm 90 to deflect while mating the plug interconnect assembly 11 with the receptacle interconnect assembly 12. The locking edge 93 of locking arm 90 is configured to engage the rear wall 23 of optical interconnect 20 to lock the plug interconnect assembly 11 to the receptacle interconnect assembly 12.

Engagement section 94 has a web engagement projection 95 that extends from surface 96 of the locking arm 90 at a position near the locking section 91 but rearward of the tapered inner surface 92. The web engagement projection 95 may include a cantilevered forwardly extending tapered tip 97. The web engagement projection 95 is configured to slidingly engage the tapered edge 50 and the reduced width edge 51 of web 41. The web engagement projection 95 may further include a tapered rear surface 98 to assist in assembling the plug interconnect assembly 12. As depicted, the web engagement projection 95 is generally aligned with the locking edge 93 of the locking section 91 although the position of the projection is dependent upon the configuration of recess 46 and the edges of web 41 associated with the recess.

Ferrule 100 is a multi-fiber ferrule having a mating face 101 with a plurality of bores 102 configured to receive an optical fiber 111 in each bore. Each bore 102 defines an optical axis along which light may pass between an optical fiber 111 within ferrule 100 and a mating optical waveguide of optical interconnect 20. Ferrule 100 includes a pair of guide post receptacles 103 into which a pair of guide posts 26 within receptacle 25 may be inserted to align the waveguides of the optical interconnect 20 with optical fibers 111 within ferrule 100. An opening or window 104 may extend from an outer surface 105 and intersect with bores 102. An adhesive such as epoxy may be applied to through window 104 to secure the optical fibers within bores 102. While ferrule 100 is depicted with a multi-fiber MT type interface having two rows of twelve optical fibers, other configurations of interfaces are contemplated.

Each optical fiber cable 110 has a plurality of optical fibers 111 therein and an outer jacket or cover 112 surrounding the cable. An end of each optical fiber 111 is positioned in ferrule 100.

Plug interconnect assembly 12 may also include a resilient boot 120. The resilient boot 120 includes a plug end 121, a cable end 122, and a central section 123 therebetween. The plug end 121 includes an enlarged opening 124 for receiving a portion of cover 40 and base 70 adjacent back wall 44 of cover 40. The cable end 122 receives the optical fiber cables 110 therein and may be configured to limit the radius to which the cable may be bent to reduce strain on the cable and the optical fibers 111 therein. The central section 123 includes an interior surface (not shown) configured to lockingly engage the boot engaging projections 67 that extend from opposite sides of the rear section 43 of cover 40. In addition, the central section 123 may further include an opening 125 through which locking projection 68 of rear section 43 may extend. The boot 120 may further include holes or bores 126 such as at central section 123 in which a tool may be inserted to assist in removing the plug interconnect assembly 12 from the receptacle interconnect assembly 11.

To assemble plug interconnect assembly 12, an end of the optical fiber cable 110 is inserted through the cable end 122 of resilient boot 120 so that the end of the cable exits the enlarged opening 124 at the plug end 121 of the resilient boot. Individual optical fibers 111 of optical fiber cable 110 are prepared and inserted into each of the bores 102 of ferrule 100 and are secured therein such as with epoxy applied to the optical fibers through window 104 in the ferrule. The ends of the optical fibers 111 are then prepared such as by cleaving and polishing the cleaved ends to a desired finish. A spring 130 is inserted into each spring-receiving recess 76 of base 70. The terminated ferrule 100 with the optical fibers 111 terminated thereto is inserted into the ferrule receiving recess 81 with the rear wall 106 of the ferrule engaging the forward end 131 of each spring 130. In such a configuration, a portion of each cable 110 extends through the opening 77 between the L-shaped walls 75 of base 70.

Cover 40 is positioned spaced from and rearward of the base 70 and the ferrule 100 generally along the central axis 15 of the plug interconnect assembly 12. The optical fiber cables 110 may be positioned within the cable receiving slot 65 or the cables may be bent so that they extend away from the cable receiving slot.

The cover 40 is then slid or moved relatively towards the base 70 and ferrule 100 so that the rails 55 on the sidewalls 42 of the cover are aligned with the channels 82 along the outer surface of each sidewall 74. The tapered leading edge 61 of the forward section 57 of each rail 55 enters one of the channels 82 at the rearward section 86 adjacent the rear edge 83 of body 71. The tapered leading edge 61 slides along the rearward section 86 of channel 82 until reaching the vertical bar 84 that extends across the channel. The engagement of the tapered leading edge 61 of the forward section 57 of rail 55 with the vertical bar 84 of channel 82 causes relative flexing or deflection between the sidewalls 42 of cover 40 and the sidewalls 74 of base 70 until the forward section 57 of rail 55 passes the vertical bar 84 of channel 82. At such point, the sidewalls 42 of cover 40 and the sidewalls 74 of base 70 deflect back to their original positions.

Forward section 57 of rail 55 of cover 40 is slidingly positioned within the forward section 85 of channel 82 of base 70 and the rearward section 60 of rail 55 is slidingly positioned within the rearward section 86 of channel 82. The vertical bar 84 of each channel 82 is slidingly positioned within each recess 56 of rail 55. As a result of this configuration, the cover 40 and base 70 may slide axially relative to each other with the stroke of such relative movement defined by the width of the recess 56. In other words, base 70 may move relative to cover 40 between a first or rearward position at which the vertical bar 84 engages the rear section 60 of rail 55 and a second or forward position at which the vertical bar 84 engages the rear edge of the forward section 57 of the rail.

While sliding the cover 40 relative to the base 70 and ferrule 100 to assemble the cover to the base, the leading edge 45 of forward portion 47 of web 41 engages the engagement section 94 and the relatively thin configuration of web 41 permits the web to slide over the engagement section 94 until the engagement section reaches one of the recesses 46 in the forward portion 47 of web 41. If desired, tapered rear surface 98 may be provided on the engagement section 94 to guide the leading edge 45 of the web 41 over the engagement section 94.

In addition, while sliding cover 40 relative to base 70 and ferrule 100 to assemble the cover to the base, the ferrule engaging projection 63 of cover 40 will engage and slide over the upper surface 105 of the ferrule 100 until the projection reaches window 104 of the ferrule. The spaced apart projections 62 of the cover 40 are configured to be laterally aligned with the springs 130 and engage an outer surface thereof to support the springs and maintain the springs within the spring-receiving recesses 76 of base 70.

If the optical fiber cable 110 is spaced from the cable receiving slot 65 of cover 40, the cable is then pressed into the cable receiving slot 65 with the cable engaging projections 66 engaging the outer cover 112 of the cable to secure it in place. The boot 120 may then be slid axially along the optical fiber cable 110 until the rearward portion of the plug interconnect assembly 12 slides into the enlarged opening 124 and the plug end 121 of the resilient boot. The boot engaging projections 67 engage the central section 123 of boot 120 to lockingly engage and secure the boot to the cover 40. Locking projection 68 of cover 40 slides into and projects from opening 126 in the boot 120.

The plug interconnect assembly 12 includes a plurality of advantageous features. In one example, as may be seen in FIGS. 3 and 6, cover 40 and base 70 interact to provide or define a U-shaped alignment opening for aligning the plug interconnect assembly 12 with the optical interconnect 20. More specifically, the leading edge of the inner surface 92 of the locking arms 90 and the leading edge 45 of web 41 are generally aligned along the central axis 15 of plug interconnect assembly 12 to define a U-shaped alignment opening. The U-shaped alignment opening assists in centering the plug interconnect assembly 12 relative to the optical interconnect 20.

The mating optical fiber interconnect system 10 thus includes three alignment features with each increasing in accuracy. The first alignment feature is the profile of the cover 41 and the resulting interaction between the plug interconnect assembly 12 and the housing receptacle 28 of optical device housing 27 as the plug is initially inserted into the receptacle. The second alignment feature is the U-shaped alignment opening defined by the locking arms 90 and the web 41 with then interact with the outer surfaces (i.e., sidewalk 24 and the top wall) of the optical interconnect 20). Finally, the third alignment feature is the pair of guide post receptacles 103 in ferrule 100 that interact with guide posts 26 within the receptacle 25 of optical interconnect 20 to accurately align the optical fibers 111 within the ferrule with the waveguides of the optical interconnect.

In another example, the cover 40 is slidable relative to base 70 between a first operative or locking position and a second operative or unlocking position. At the first operative position, the engagement section 94 adjacent the tapered edge 50 and the reduced width edge 51 and the locking arms 90 are at their first operative or locked position and thus configured to engage the rear wall 23 of the optical interconnect. At the second operative position, the cover 40 has been slid rearward relative to base 70 and the engagement section 94 slides along the tapered edge 50 which causes the locking arms 90 to deflect outward. This outward movement or deflection results in the locking edges 93 of the locking arms 90 being spaced apart wider than the width of optical interconnect 20 and allows the plug interconnect assembly 12 to be unmated from the receptacle interconnect assembly 11.

In still another example, the ferrule engaging projection 63 on cover 40 and the projections 80 on base 70 cooperate with ferrule 100 to return, to some extent, the cover and the base to the first operative or locking position. More specifically, the rear edge 106 of ferrule 100 interacts with projections 80 to limit the movement of the ferrule relative to the base 70. In addition, the window 104 of ferrule 100 interacts with the ferrule engaging projection 63 to limit movement of the ferrule relative to the cover 40. Compression of the springs 130 during unmating combined with the limitations on relative movement of the ferrule with respect to each of the cover 40 and the base 70 result in the springs 130 forcing the cover back towards the first operative position. In other words, springs 130 serve a dual purpose of biasing the ferrule 100 forward in a mating direction and also bias the cover 40 rearward or towards its unlocking position after unmating.

In a further example, the plug optical interconnect 12 has a very low profile and the mating end portion 14 thereof is approximately equal in height to the height of the base 70. More specifically, the lower surface of the base 70 defines the lower surface of the mating end portion 14 and the engagement section 94 is generally co-planar with the upper surface of web 41 at, the forward portion 47 of the web. Accordingly, the opening into which the mating end portion 14 may be inserted may have a low profile.

Referring to FIGS. 1-2 and 6-11, a sequence for mating the plug optical assembly 12 to the receptacle optical assembly 11 is depicted. FIG. 2 is generally identical to FIG. 1 but with optical device housing 27 and heat sink 30 removed for clarity. It should be noted that the components of FIGS. 6-11 correspond to those depicted in FIG. 2 but with a portion of the web 41 of cover 40 removed for clarity.

In FIGS. 1-2, the plug interconnect assembly 12 is initially aligned with the housing receptacle 28 of the optical device housing 27 generally along the mating axis 13. As may be seen in FIG. 2, plug interconnect assembly 12 is generally aligned with the optical interconnect 20 mounted to optical device substrate 21. As the plug interconnect assembly 12 is moved towards the receptacle optical interconnect 11, the housing receptacle 28 acts as a gross or course guide to generally align the plug interconnect assembly with the optical interconnect 20.

Figure 7:
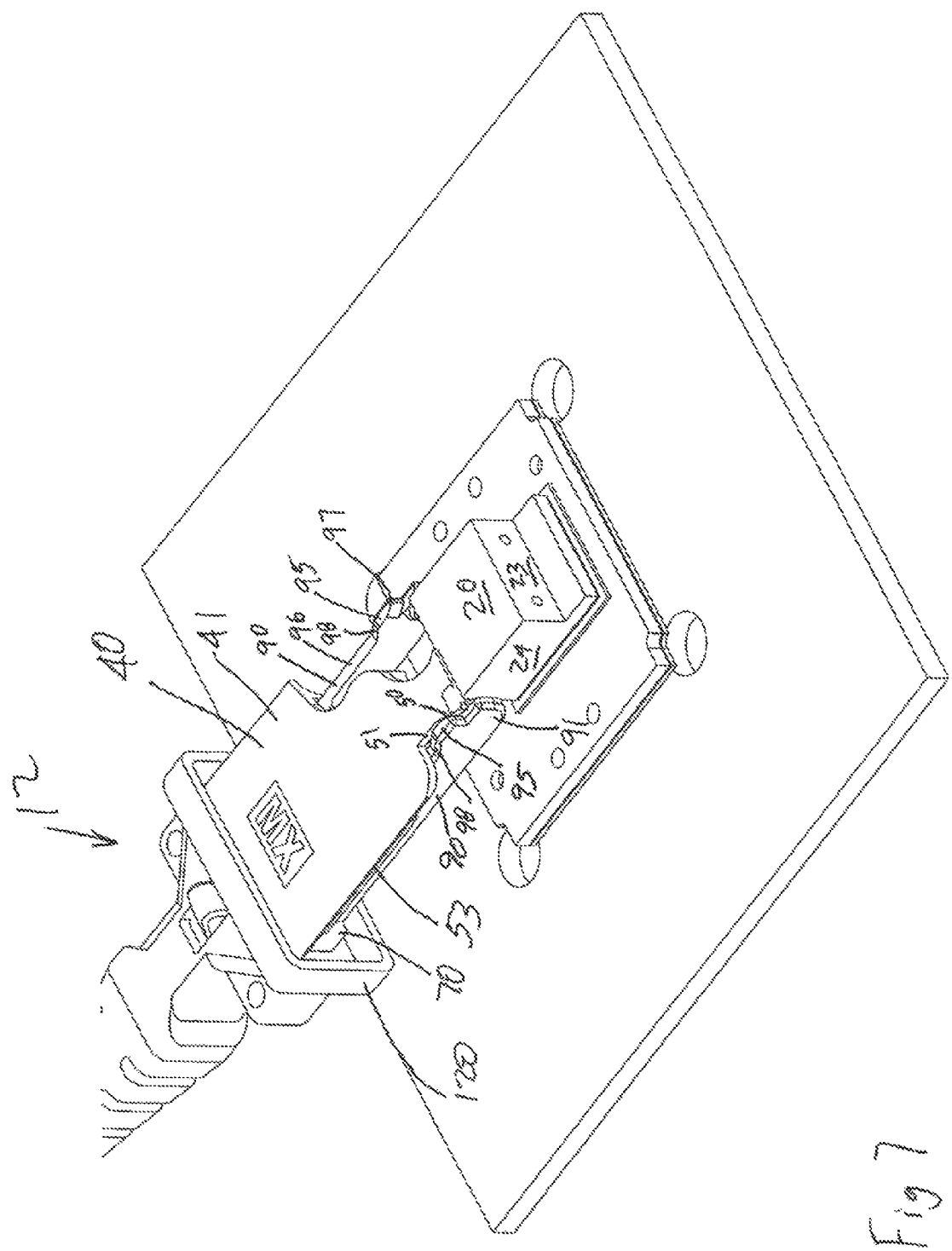
FIG. 7 is a perspective view of the mating optical fiber interconnect system of FIG. 6.

Once the plug interconnect assembly 12 begins to engage the optical interconnect 20 as depicted in FIGS. 6-7, the tapered inner surface 92 of locking section 91 of the locking arms 90 initially engage the sidewalls 24 of the optical interconnect 20 to more accurately align or center the plug interconnect assembly laterally or horizontally relative to the optical interconnect. The leading edge 45 of web 41 of cover 40 acts as a generally planar, horizontal guide to assist in more accurately vertically aligning the plug interconnect assembly 12 with the optical interconnect 20. Until the looking arms 90 are deflected by the engagement with the sidewalk 24 of the optical interconnect 20 the web engagement projection 95 of engagement section 94 of the locking arms 90 may be positioned within one of the recesses 46 along their respective tapered edge 50 and reduced width edge 51.

Figure 8:
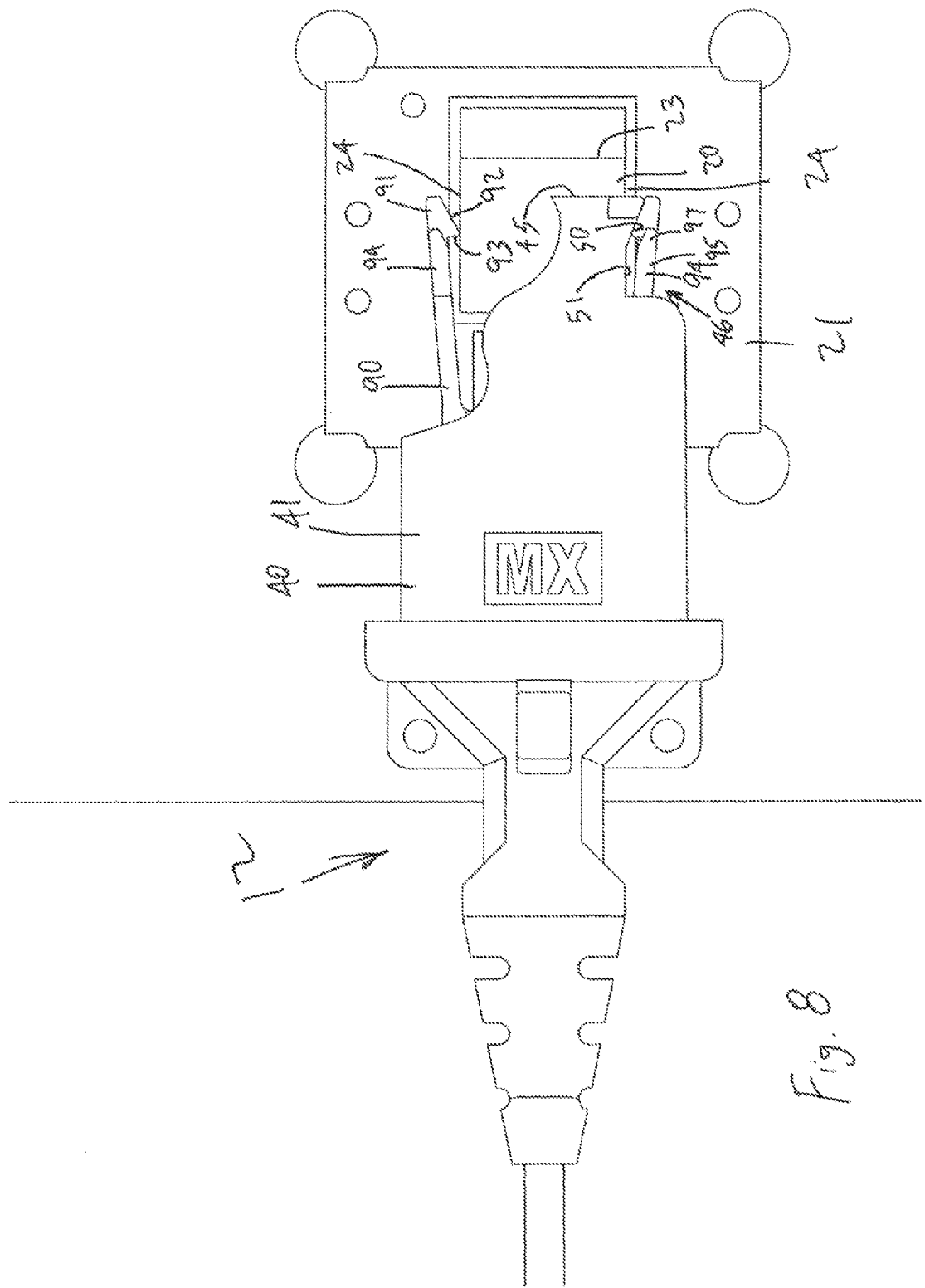
FIG. 8 is a top plan view of the mating optical fiber interconnect system of FIG. 6, with the plug interconnect assembly partially mated to the receptacle interconnect assembly.
Figure 9:
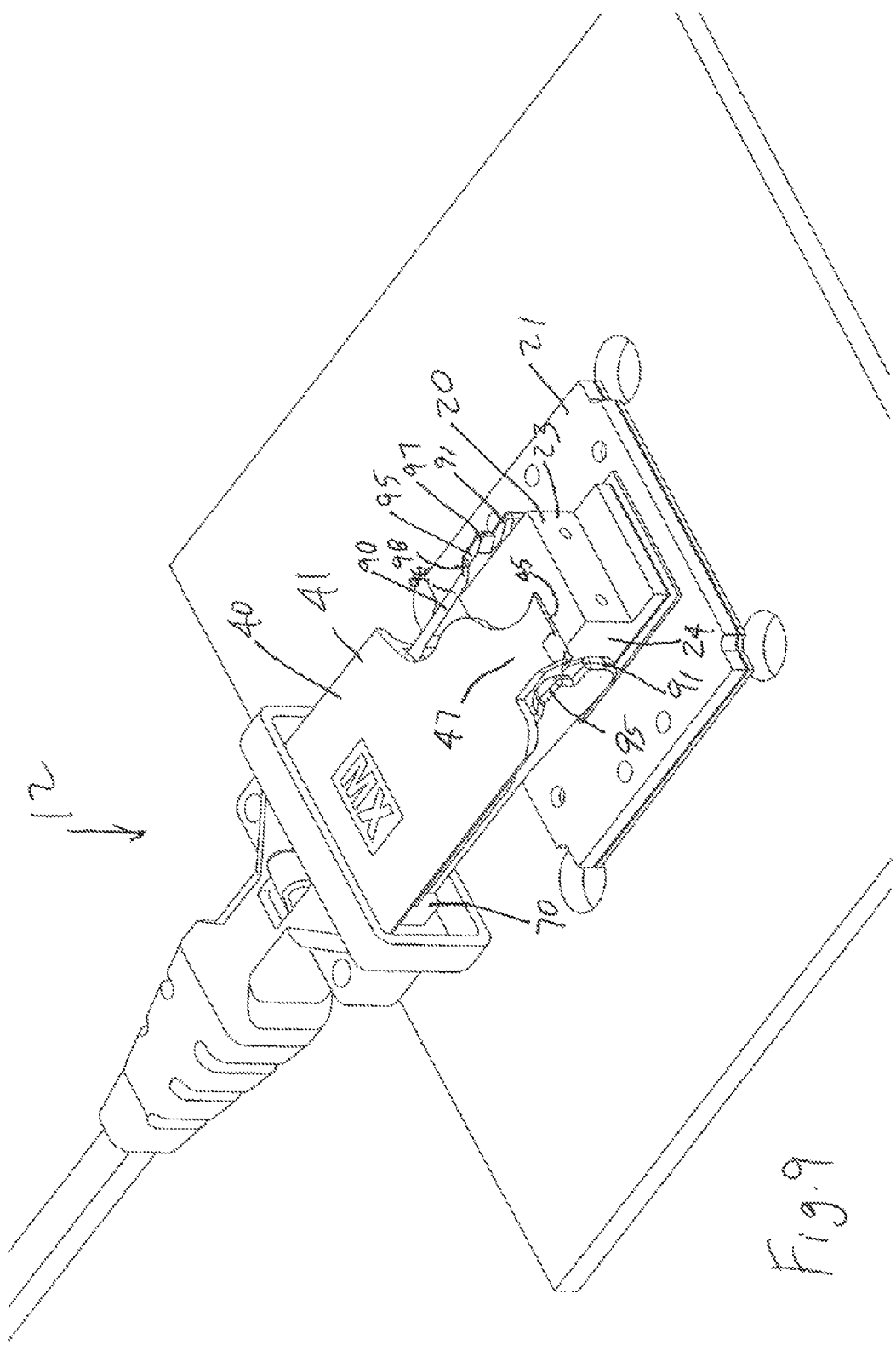
FIG. 9 is a perspective view of the mating optical fiber interconnect system of FIG. 8.

Referring to FIGS. 8-9, the plug interconnect assembly 12 has slid further along sidewalls 24 of optical interconnect 20. The engagement of the tapered inner surface 92 of locking section 91 of the locking arms 90 with the sidewalls 24 of optical interconnect 20 results in the deflection of the locking arms outward away from the sidewalls. The web engagement projection 95 of engagement section 94 of each locking arm 90 is thus moved laterally away from the tapered edge 50 and reduced width edge 51 of their respective recess 46 in the web 41. As best seen in FIG. 6, the mating face 102 of ferrule 100 is spaced from the front wall 22 of optical interconnect 20.

As the plug interconnect assembly 12 continues to be mated onto the optical interconnect 20, the guide post receptacles 103 of ferrule 100 will be aligned with the guide posts 26 within the receptacle 25 of the optical interconnect 20 to accurately align the optical fibers 111 within ferrule 100 with the waveguides of the optical interconnect. As the plug interconnect assembly 12 reaches its fully mated position, the mating face 102 of the ferrule 100 will engage the interior mating face (not shown) of the optical interconnect 20. As such, the ferrule 100 is no longer able to move further in the axially or insertion direction.

As the plug interconnect assembly 12 continues to move in the mating direction, the cover 40 and base 70 will continue to move forward (in the mating direction) but the engagement of the mating face 102 of ferrule 100 with the internal mating face of the optical interconnect 20 will stop the movement of the ferrule. Accordingly, cover 40 and base 70 will move relative to the ferrule 100 and the springs 130 are compressed between the spring-receiving recesses 76 and the ferrule 100.

Figure 10:
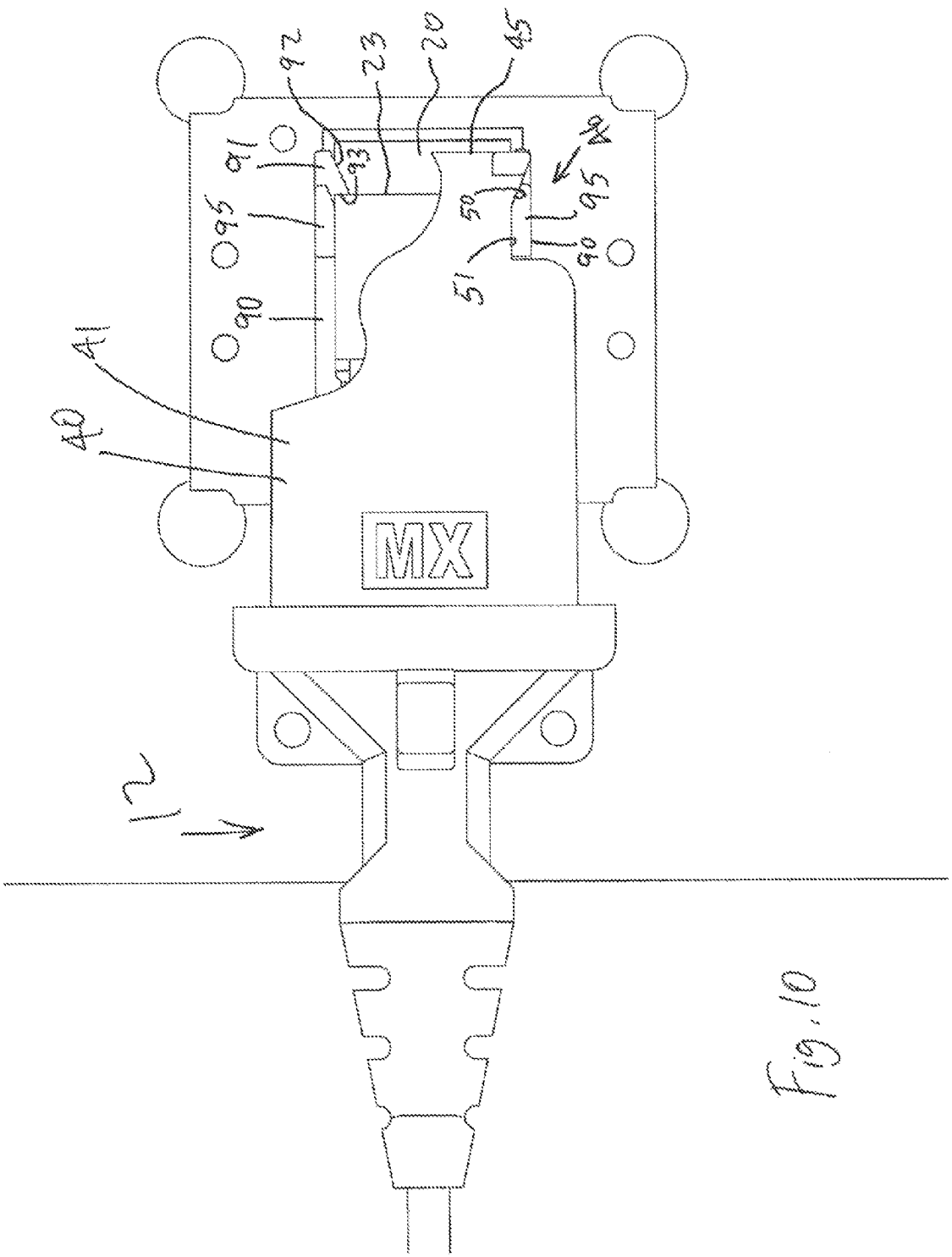
FIG. 10 is a top plan view of the mating optical fiber interconnect system of FIG. 6, with the plug interconnect assembly fully mated to the receptacle interconnect assembly.
Figure 11:
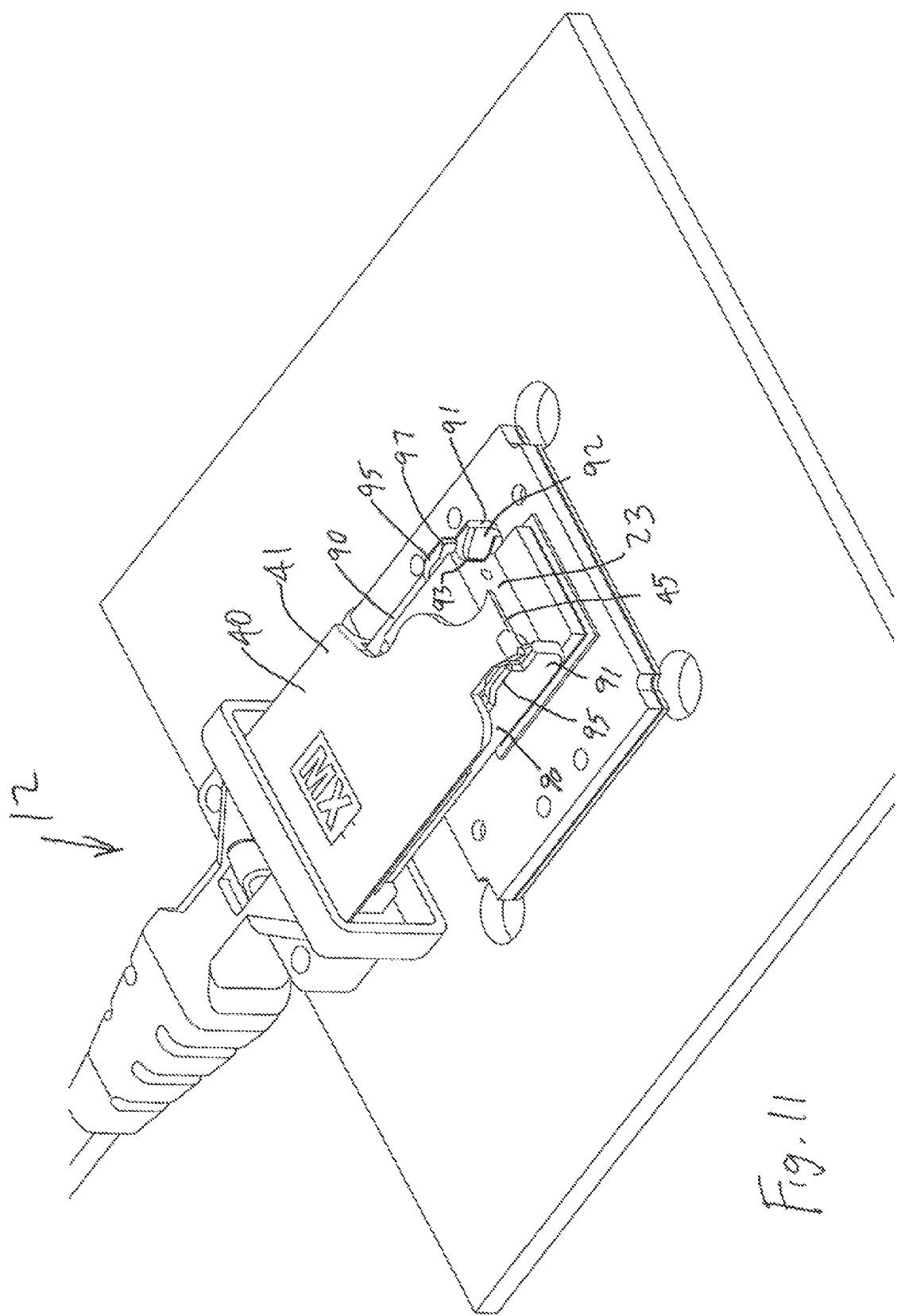
FIG. 11 is a perspective view of the mating optical fiber interconnect system of FIG. 10.

The plug interconnect 12 is moved forward in the mating direction until the locking edge 93 of the locking section 91 of each locking arm 90 moves past the rear wall 23 of optical interconnect 20. At such point, the resilient nature of the locking arms 90 will cause them to spring or snap inward to their undeflected position with the web engagement projection 95 of engagement section 94 positioned along the tapered edge 50 and reduced width edge 51 of their respective recess 46 of web 41. When the user releases the plug interconnect assembly 12, the spring force stored by the compression of springs 130 forces the cover 40 and base 70 rearward while maintaining the mating face 102 of ferrule 100 in the mated position relative to the internal mating face of optical interconnect 20. The rearward movement of base 70 causes the locking edges 93 of locking arms 90 to engage the rear wall 23 of optical interconnect 20 and locks the plug interconnect assembly 12 to the receptacle interconnect assembly 11 as depicted in FIGS. 10-11.

Figure 12:
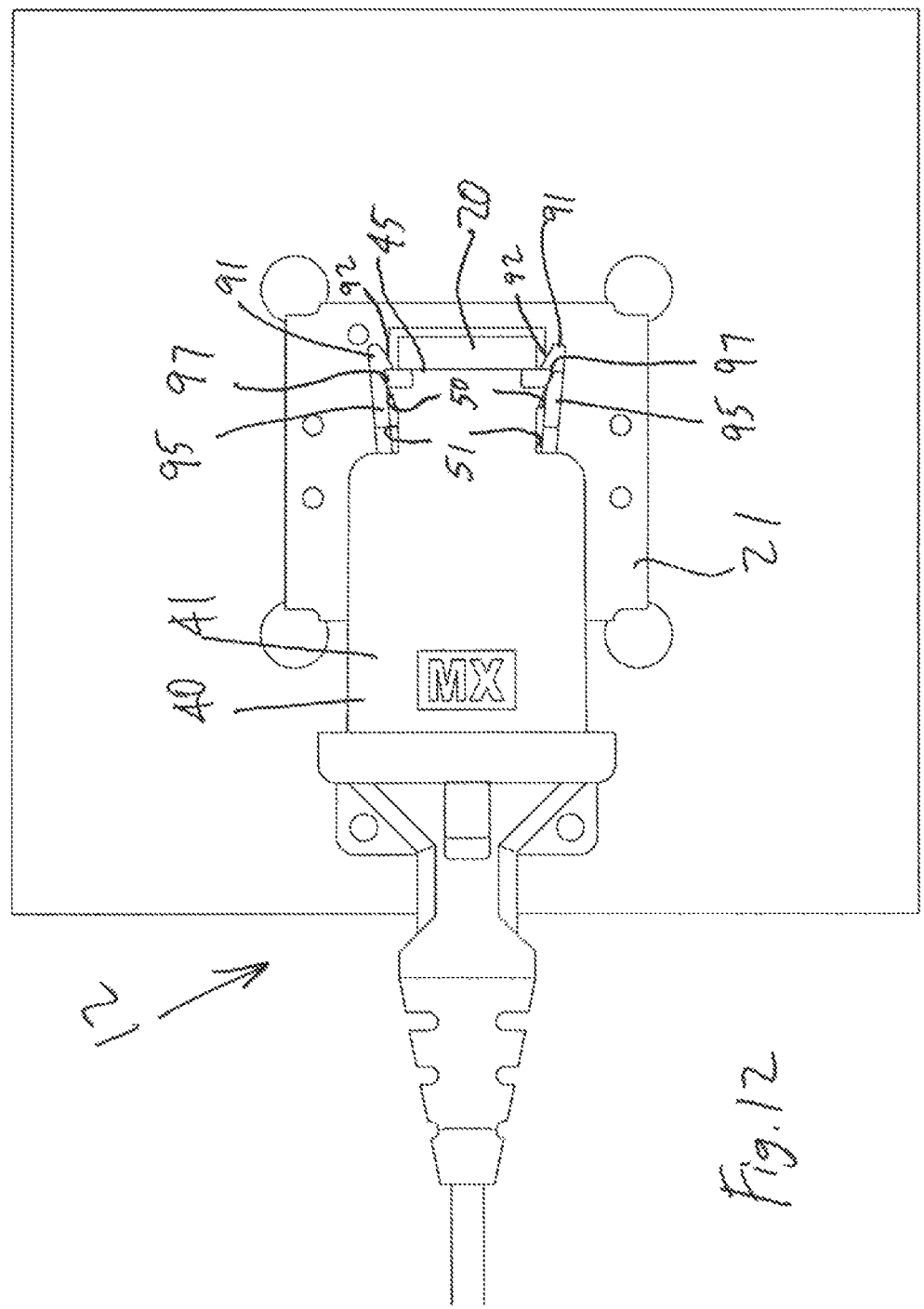
FIG. 12 is a top plan view similar to FIG. 10, with the plug interconnect assembly unlocked from the receptacle interconnect assembly.
Figure 13:
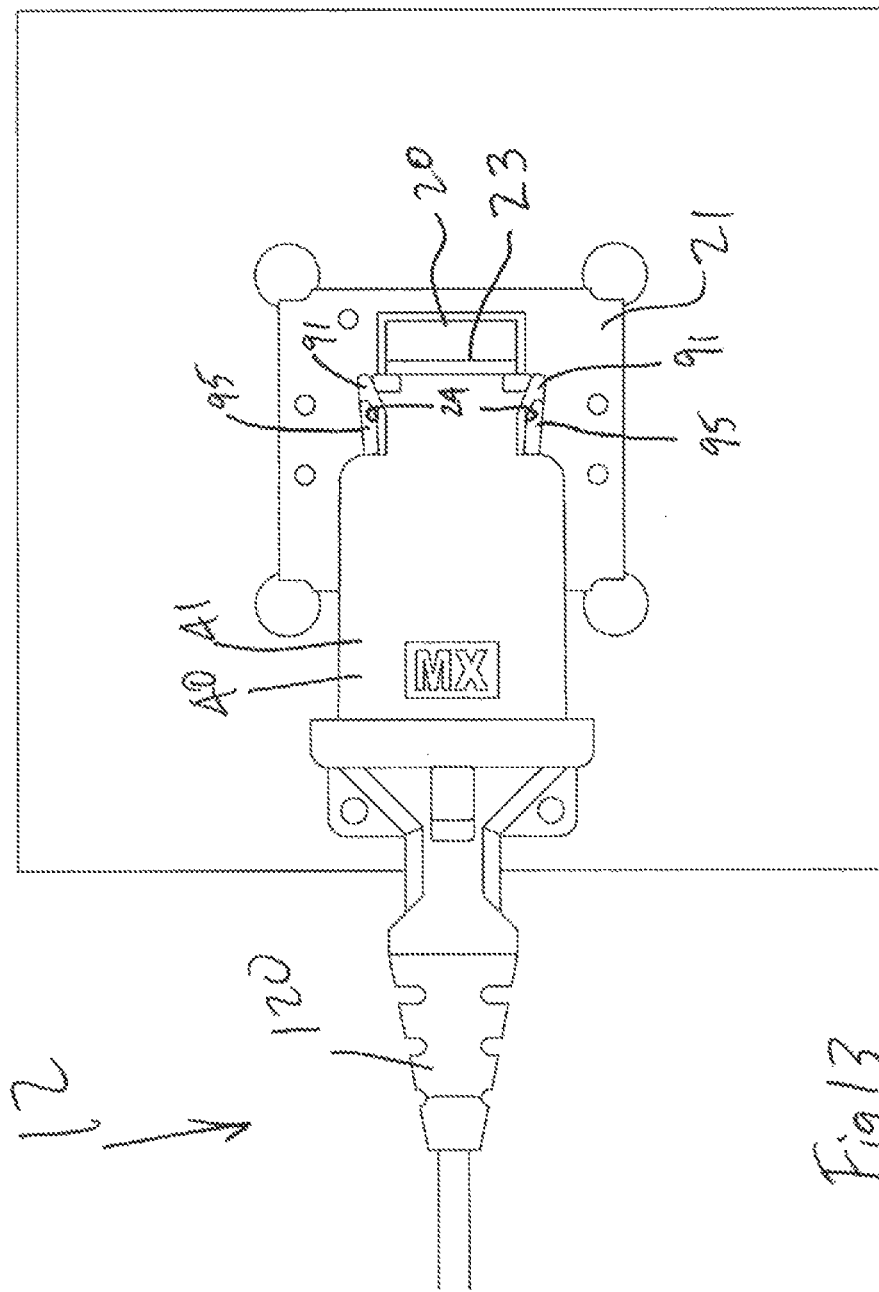
FIG. 13 is a top plan view similar to FIG. 12, with the plug interconnect assembly being unmated from the receptacle interconnect assembly.
Figure 14:
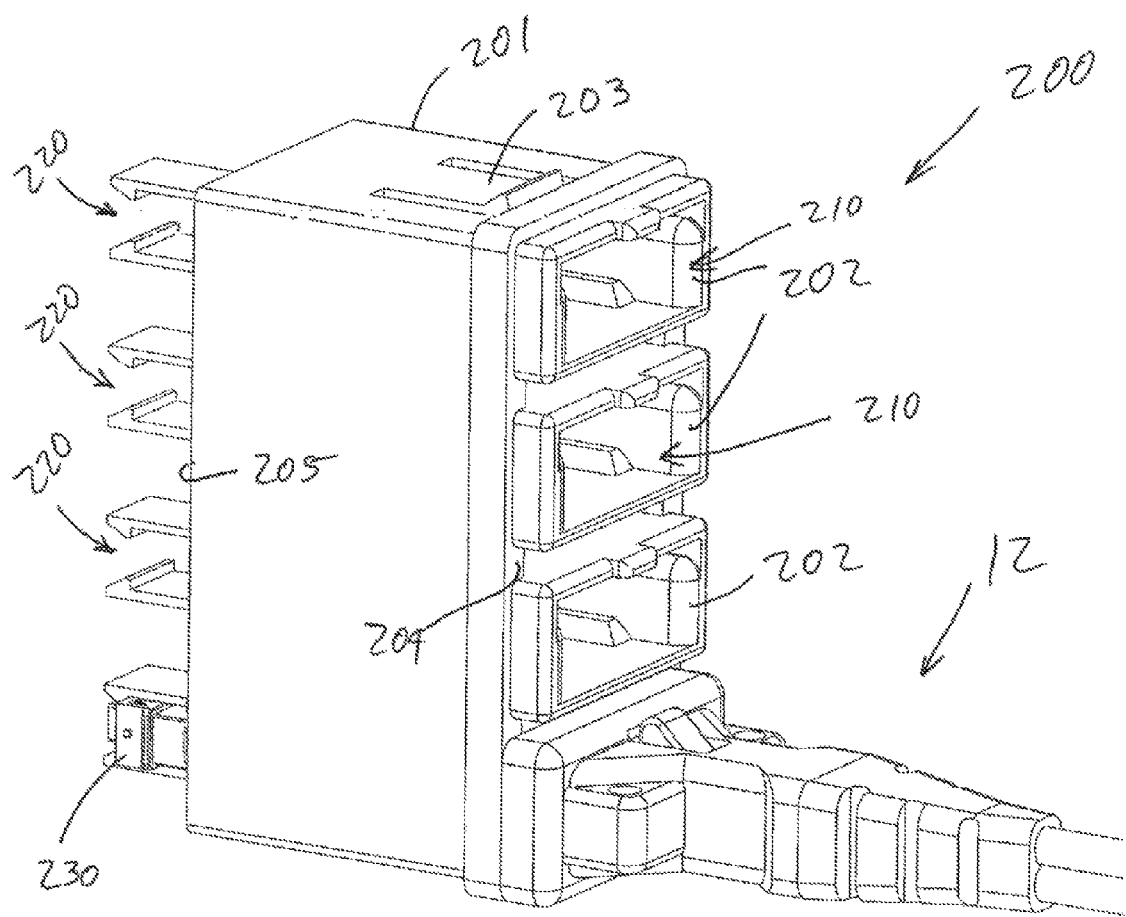
FIG. 14 is a perspective view of the plug interconnect assembly mated to one receptacle of an alternate embodiment of a receptacle interconnect assembly.
Figure 15:
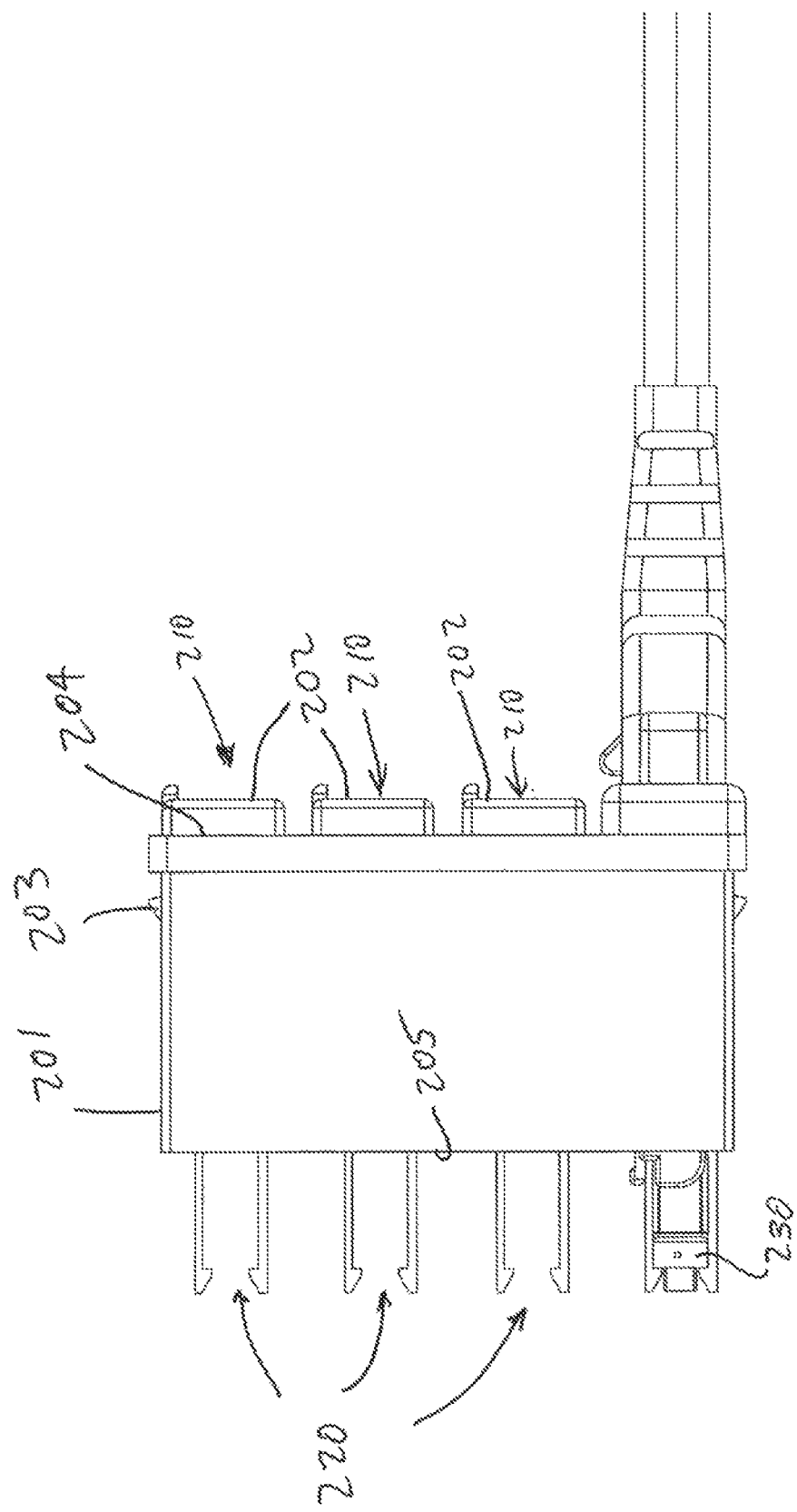
FIG. 15 is side view of the interconnect system of FIG. 14.

When unmating the plug interconnect assembly 12 from the receptacle interconnect assembly 11, actions are generally reversed. The components are thus initially positioned as depicted in FIGS. 10-11. FIGS. 12-13 depict a sequence of unmating the plug interconnect assembly 12 from the receptacle interconnect assembly 11. It should be noted that a portion of the web 41 that was removed in FIGS. 6-11 for clarity is not removed in FIGS. 12-13.

To unmate the plug interconnect assembly 12, an operator grasps the cover 40 and resilient boot 120 generally at the central section 125 of the resilient boot. Applying a rearward or unmating force to the cover 40 causes the cover to slide rearwardly relative to the base 70 as depicted in FIG. 12. The rearward movement of the cover 40 will cause the engagement of the tapered edges 50 of web 41 with the web engagement projection 95 of the engagement section 94 of each locking arm 90. The angled shape of tapered edges 50 forces the locking arms 90 to deflect outward as depicted in FIG. 12. Tapered edges 50 are dimensioned such that the rearward movement of the cover 40 causes sufficient deflection of the locking arms 90 so that the locking edges 93 of the opposed locking arms 90 are spaced farther apart than the width of the optical interconnect 20 (i.e., the distance between sidewalk 24).

As the cover 40 moves rearward but before the locking arms 90 have moved or been deflected laterally sufficiently to release the base 70, the ferrule engaging projection 63 moves within window 104 of ferrule 100. Once the projection 63 engages the rear edge 106 of the window 104, continued rearward movement of the cover 40 causes the ferrule 100 to slide rearward with the cover 40 and relative to the base 70. This rearward movement of the ferrule 100 relative to base 70 further compresses the springs 130.

Continued movement of the cover 40 rearwardly will cause the base 70 and ferrule 100 to move rearwardly with the cover and with the locking sections 91 of locking arms 90 sliding along the sidewalk 24 of the optical interconnect 20. Depending upon the characteristics of the springs 130, when the locking edges 93 of the locking arms 90 no longer engage the rear wall 23 of the optical receptacle 20, the spring force within springs 130 may cause the base 70 to slide rearwardly relative to the cover 40 so that the engagement section 94 is generally aligned with the tapered edge 50 and the reduced width edge 51 of recess 46. In other instances, as depicted in FIG. 13, the spring force may be insufficient to cause the base 70 to slide relative to the cover 40 until the locking section 91 of the locking arms 90 no longer engage the sidewalk 24 of the optical device 20. In such case, once the plug interconnect assembly 12 has been moved back to the position depicted in FIGS. 6-7, the spring force may be sufficient to return the cover 40 to or at least towards its original position relative to the base 70.

Plug interconnect assembly 12 may also be mated with other types of optical fiber assemblies. Referring to FIGS. 14-17, an array of panel mount receptacles is depicted to which the plug interconnect assembly 12 may be mated. As depicted, panel mount assembly 200 has a housing 201 with four receptacles 202. Panel mount assembly 200 may be inserted into a panel (not shown) as is known in the art and includes a pair of deflectable locking arms 203 on opposite sides thereof for retaining or locking the housing 201 to the panel.

Each receptacle 202 has a plug receiving section 210 in communication with an optical interconnect mounting section 220. The plug receiving section 210 is generally adjacent the front or mating face 204 of the housing 201 and is configured to receive a portion of the plug interconnect assembly 12 therein. The optical interconnect mounting section 220 is adjacent the rear face 205 of the housing 201 and is configured to receive an optical interconnect such as ferrule 230. As depicted, ferrule 230 is generally similar to ferrule 100 of plug interconnect assembly 12 and the description thereof is not repeated. Like components are identified with like reference numbers. The optical interconnect may be any type of optical interconnect such as those having one or more waveguides or light sources therein. Ferrule 230 may further include guide posts 231 to assist in alignment of the optical fibers of ferrule 100 with optical fibers positioned within ferrule 230.

Figure 16:
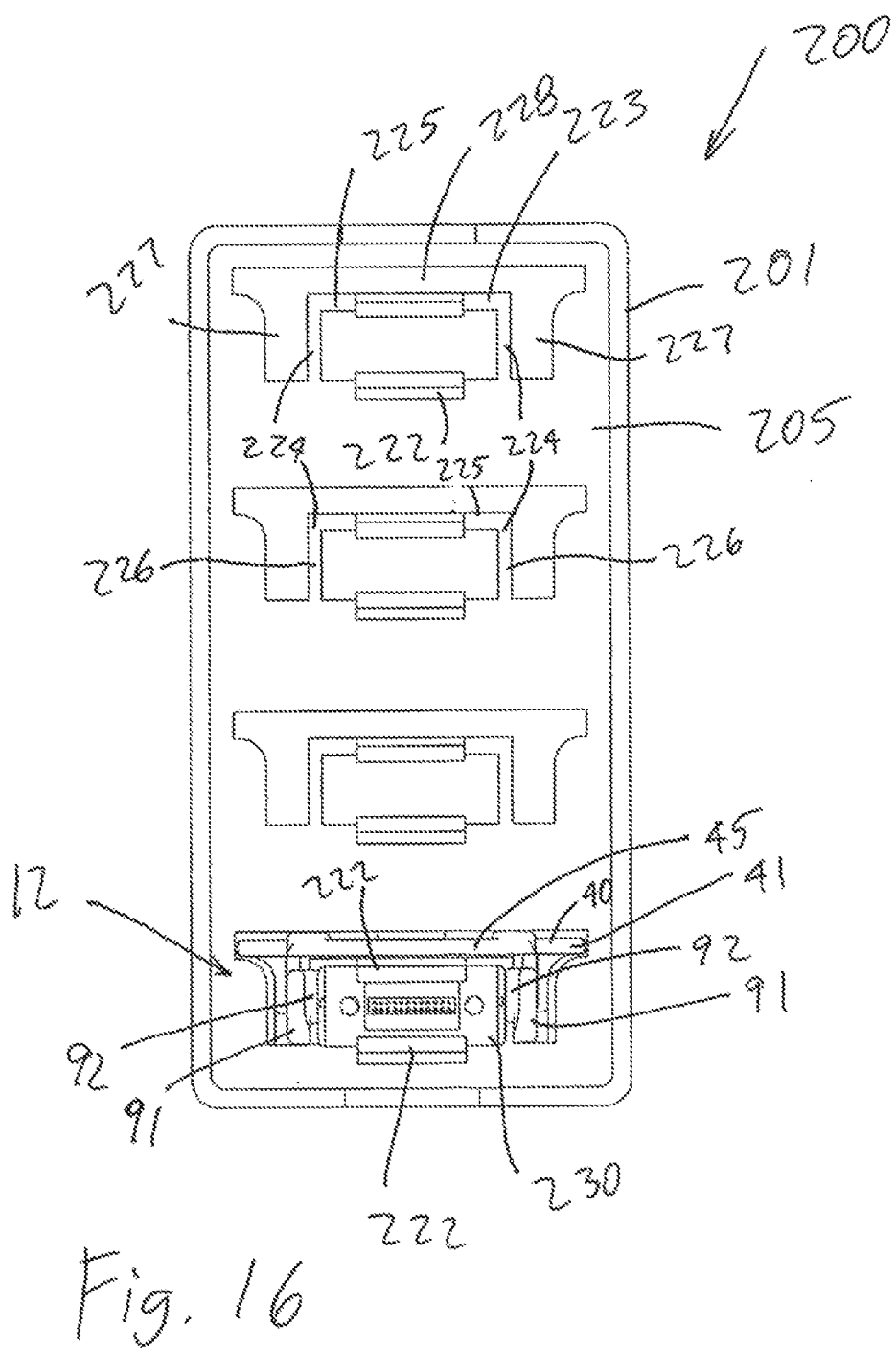
FIG. 16 is rear view of the interconnect system of FIG. 14.
Figure 17:
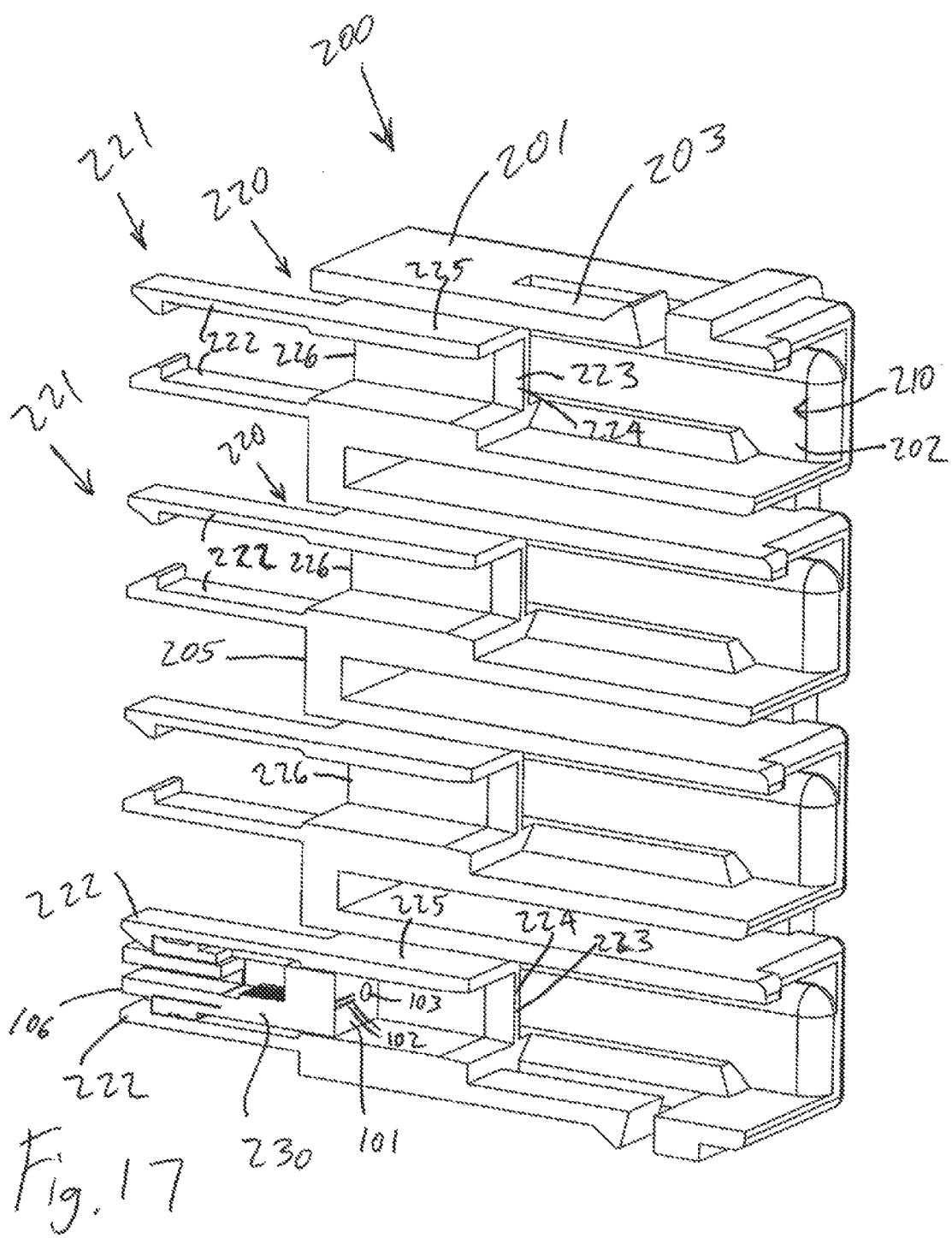
FIG. 17 is perspective view of a section taken generally along Line 17-17 in FIG. 16, with the plug interconnect assembly removed for clarity.

Referring to FIGS. 16 and 17, each optical interconnect mounting section 220 includes a ferrule mounting structure 221 for retaining and positioning the ferrule 230 within the housing 201. The ferrule mounting structure 221 may include a locking structure such as a pair of resilient arms 222 to retain the ferrule in the housing 201. The ferrule mounting structure 221 may further include a U-shaped positioning member 223 in which a portion of the ferrule 230 is positioned. The side legs or sidewalls 224 of the U-shaped member 223 position the ferrule 230 laterally or horizontally and the upper wall 225 of the U-shaped member 223 and the lower wall of receptacle 202 position the ferrule 230 vertically within the housing. With such a structure, a continuous or interconnected series of openings (two vertical openings 227 interconnected by one horizontal opening 228) are provided in which the leading edge 45 of web 41 of cover 40 and the locking arms 90 of base 70 may be inserted.

The sidewalls 224 of the U-shaped member 223 define a rear surface 226 against which the locking edge 93 of locking arms 90 of an inserted plug interconnect assembly 12 may engage to retain the plug interconnect assembly to the panel amount assembly 200. As such, when mating the plug interconnect assembly 12 to the panel amount assembly 200, the mating and unmating sequence is essentially identical to that described above with respect to FIGS. 1-13. However, rather than the locking section 91 of locking arms 90 engaging the sidewalls 24 of the optical interconnect 20, locking section 91 of the locking arms engage the sidewalls 224 of the U-shaped member 223. In other embodiments, the optical interconnect may be mounted to the housing in other manners, in addition, if desired, the locking section 91 of each locking arm 90 may be configured to directly engage the outer surface of the ferrule 230.

While a preferred embodiment of the Present Disclosure is shown and described, it is envisioned that those skilled in the art may devise various modifications without departing from the spirit and scope of the foregoing Description and the appended Claims.

What is claimed is:

1. An optical fiber interconnect assembly, the optical fiber interconnect assembly comprising:
a first housing component, the first housing component including a pair of spaced apart deflectable locking arms, each locking arm having a locking section and a locking arm engagement section, the locking section engaging a mating optical component, each locking arm being movable between a first operative position, at which each locking section engages the mating optical component to lock the optical fiber interconnect assembly to the mating optical component, and a second operative position, at which each locking arm is deflected and each locking section is spaced from the mating optical component;

a second housing component operatively slidable relative to the first housing component between a locking position and an unlocking position, the second housing component having a second housing component engagement section which engages each locking arm engagement section to move the locking arm to the second operative position upon movement of the second housing component to the second unlocking position;

a ferrule receiving opening disposed between the first housing component and the second housing component;

a multi-fiber ferrule movably mounted within the ferrule receiving opening, the ferrule including a plurality of bores, each bore receiving an optical fiber therein; and at least one biasing member to bias the ferrule for movement within the ferrule receiving opening in a direction of mating the optical fiber interconnect assembly.

2. The optical fiber connector assembly of claim 1, wherein the spring member further biases the second housing component in a direction toward the locking position.

3. The optical fiber connector assembly of claim 2, wherein the second housing component includes a projection configured to engage the ferrule and limit movement of the ferrule relative to the second housing component, the engagement of the projection with the ferrule assisting in biasing the second housing component in a direction toward the locking position.

4. The optical fiber connector assembly of claim 1, wherein each locking arm engagement section projects from the locking arm in a direction generally perpendicular to a direction of movement between the first operative position and the second operative position.

5. The optical fiber connector assembly of claim 1, wherein the second housing component has a forward portion, the forward portion having a generally planar upper surface, the upper surface being generally co-planar with an upper surface of each locking arm.

6. The optical fiber connector assembly of claim 5, wherein the forward portion and each locking arm generally defines a U-shaped alignment opening.

7. The optical fiber connector assembly of claim 6, wherein leading edges of each locking arm and of the forward portion are generally aligned in a mating direction.

8. The optical fiber connector assembly of claim 1, wherein at least one of each locking arm engagement section or the second housing component engagement section have an angled surface.

9. The optical fiber connector assembly of claim 8, wherein each locking arm engagement section and each second housing component engagement section have angled surfaces.

10. The optical fiber connector assembly of claim 1, wherein the second housing component includes a web, the web having a generally flexible portion adjacent a leading edge thereof.

11. The optical fiber connector assembly of claim 1, wherein a forward portion of the second housing component includes recesses on opposite sides thereof, one of the locking arm engagement sections being movably positioned within one of the recesses.

12. An optical fiber plug interconnect assembly, the optical fiber plug interconnect assembly comprising:

a first housing component, the first housing component including a pair of spaced apart deflectable locking arms, each locking arm having a locking section and an engagement section, the locking section engaging a mating optical component, each locking arm being movable between a first operative position, at which each locking section engages the mating optical component to lock the optical fiber interconnect assembly to the mating optical component, and a second operative position, at which each locking arm is deflected and each locking section is spaced from the mating optical component;

a second housing component operatively slidable relative to the first housing component between a locking position and an unlocking position, the second housing component having a generally planar web with side edges configured to engage the engagement section to move the locking arm from the first operative position to the second operative position upon movement of the second housing component to the second unlocking position;

an optical fiber ferrule movably mounted within a ferrule receiving opening, the ferrule having a waveguide therein; and at least one spring member to bias the ferrule for movement within the ferrule receiving opening.

13. The optical fiber plug interconnect assembly of claim 12, wherein the second housing component has a forward portion, the forward portion having a generally planar upper surface, the upper surface being generally co-planar with an upper surface of each engagement surface.

14. The optical fiber plug interconnect assembly of claim 13, wherein the forward portion and each locking arm generally defines a U-shaped alignment opening.

15. The optical fiber plug interconnect assembly of claim 14, wherein leading edges of each locking arm and of the forward portion are generally aligned in a mating direction.

16. The optical fiber plug interconnect assembly of claim 12, wherein the first housing component has a vertical height, and a mating portion of the optical fiber plug interconnect assembly has a vertical height no greater than the vertical height of the first housing component.

17. The optical fiber plug interconnect assembly of claim 12, wherein a forward portion of the second housing component includes recesses on opposite sides thereof one of the locking arm engagement sections being movably positioned within one of the recesses.

18. The optical fiber plug interconnect assembly of claim 12, wherein the second housing component includes a web, the web having a generally flexible portion adjacent a leading edge thereof.

19. An optical fiber interconnect assembly, the optical fiber interconnect assembly comprising:

a plug interconnect assembly including:

a first housing component, the first housing component including a pair of spaced apart deflectable locking arms, each locking arm having a locking section and a locking arm engagement section, the locking section engaging a mating optical component, each locking arm being movable between a first operative position, at which each locking section engages the mating optical component to lock the optical fiber interconnect assembly to the mating optical component, and a second operative position, at which each locking arm is deflected and each locking section is spaced from the mating optical component;

a second housing component operatively slidable relative to the first housing component between a locking position and an unlocking position, the second housing component having a second housing component engagement section which engages each locking arm engagement section to move the locking arm to its second operative position upon movement of the second housing component to the second unlocking position;

a ferrule movably mounted within a ferrule receiving opening, the ferrule having a plurality of waveguides therein; and at least one spring member to bias the ferrule for movement within the ferrule receiving opening; and a receptacle interconnect assembly including:

a housing member, the housing member including at least one receptacle, each receptacle including a plug receiving section in communication with an optical interconnect mounting section, the plug receiving section receiving the plug interconnect assembly therein, the optical interconnect mounting section receiving an optical interconnect therein and including a support member for securing the optical interconnect within the optical interconnect mounting section, a side opening on each side of the optical interconnect and a top opening adjacent a top surface of the optical interconnect, each side opening receiving one of the locking arms therein and the top opening receiving a leading edge of the second housing component of the plug interconnect assembly therein; and an optical interconnect, the optical interconnect including a plurality of waveguides therein, the optical interconnect being mounted in the optical interconnect mounting section.

20. The optical fiber plug interconnect assembly of claim 19, where each side opening and the top opening are interconnected.

* * * * *